US012181255B2

(12) United States Patent
Albertoni et al.

(10) Patent No.: US 12,181,255 B2
(45) Date of Patent: Dec. 31, 2024

(54) METHOD OF IDENTIFYING AN OBJECT SIGNATURE IN AN ENVIRONMENT AND SYSTEM FOR IDENTIFYING AN OBJECT SIGNATURE IN AN ENVIRONMENT

(71) Applicant: Airbus Defence and Space GmbH, Taufkirchen (DE)

(72) Inventors: Alessandro Albertoni, Taufkirchen (DE); Karsten Riedel, Taufkirchen (DE); David Wittmann, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 404 days.

(21) Appl. No.: 17/588,483

(22) Filed: Jan. 31, 2022

(65) Prior Publication Data

US 2022/0325986 A1    Oct. 13, 2022

(30) Foreign Application Priority Data

Feb. 1, 2021  (EP) ..................................... 21154594

(51) Int. Cl.
*F41H 11/02*     (2006.01)
*F41G 7/22*      (2006.01)
(Continued)

(52) U.S. Cl.
CPC ............. *F41H 11/02* (2013.01); *F41G 7/224* (2013.01); *F41J 2/02* (2013.01); *G01S 7/495* (2013.01)

(58) Field of Classification Search
CPC ... F41H 11/02; F41G 7/224; F41J 2/02; G01S 7/495
See application file for complete search history.

(56) References Cited

U.S. PATENT DOCUMENTS 4,463,260 A    7/1984  Ikeda
5,600,434 A *  2/1997  Warm .................... F41G 7/224
                                              356/139.08
(Continued)

FOREIGN PATENT DOCUMENTS

DE    102016013960 A1    5/2018
WO    2016142938 A1      9/2016

OTHER PUBLICATIONS

Search Report for European Application No. 21154594.2 dated Jul. 9, 2021. 2 pgs.

*Primary Examiner* — Marcus E Windrich
(74) *Attorney, Agent, or Firm* — Lerner David LLP

(57) ABSTRACT

A method of identifying an object signature in an environment includes acquiring infrared information from the environment using a detection unit in order to obtain an infrared wavelength spectrum associated with the environment. The method further includes selecting three wavelength bands of the infrared wavelength spectrum using a filtering unit and detecting a presence of the three wavelength bands of the infrared wavelength spectrum in the environment by filtering the selected three wavelength bands using the filtering unit. The method further includes determining an intensity indicator for the three selected wavelength bands using a processing unit and classifying the object signature using the processing unit based on the determined intensity indicator in order to identify the object signature.

17 Claims, 3 Drawing Sheets

(51) Int. Cl.
F41J 2/02 (2006.01)
G01S 7/495 (2006.01)

(56) References Cited

U.S. PATENT DOCUMENTS

| | | | |
|---|---|---|---|
| 6,079,665 A | 6/2000 | Nella et al. | |
| 8,017,912 B1* | 9/2011 | Nelson | G01J 3/28 |
| | | | 702/135 |
| 2002/0066864 A1* | 6/2002 | Reshef | F41J 1/00 |
| | | | 250/398 |
| 2015/0073710 A1* | 3/2015 | Deierling | G01W 1/16 |
| | | | 702/4 |
| 2020/0080821 A1* | 3/2020 | Assel | G01J 1/429 |
| 2021/0270575 A1* | 9/2021 | Assel | F41H 11/02 |

\* cited by examiner

METHOD OF IDENTIFYING AN OBJECT SIGNATURE IN AN ENVIRONMENT AND SYSTEM FOR IDENTIFYING AN OBJECT SIGNATURE IN AN ENVIRONMENT

FIELD OF THE INVENTION

The invention relates to infrared observation systems. In particular, the invention relates to a method of identifying an object signature in an environment as well as to a system for identifying an object signature in an environment.

BACKGROUND OF THE INVENTION

Object signature identification is an important aspect, in particular for military defense systems. Object signature identification can be used to recognize and protect aircraft from air-to-air (AA) or surface-to-air (SA) missiles threats, including man-portable air defense systems (MANPADS). Such an identification requires extended capabilities to analyze the spectral domain. This also includes the analysis of the infrared spectrum, typically of the short-wave infrared spectrum (SWIR), the mid-wave infrared spectrum (MWIR) and the long-wave infrared spectrum (LWIR). Hyperspectral sensors suitable to capture infrared bands are complex, expensive and may be difficult to use in aircraft or other platforms due to environmental constraints, especially in military aircraft.

DE 10 2016 013 960 A1 describes an infrared (IR) optical system for missile warning, comprising an IR warning sensor for the detection of missiles based on the IR signature of their exhaust gas. A second IR sensor that is sensitive to the same IR signature of the exhaust gas is used to verify the targets detected by the IR warning sensor.

BRIEF SUMMARY OF THE INVENTION

An aspect of the invention may relate to improving object signature identification of objects in an environment.

According to an aspect of the invention, a method of identifying an object, for example an object signature, in an environment is provided. In a step of the method, infrared information from the environment is acquired using a detection unit in order to obtain an infrared wavelength spectrum associated with the environment. In another step, three wavelength bands of the infrared wavelength spectrum are selected using a filtering unit. In another step, a presence of the three wavelength bands of the infrared wavelength spectrum in the environment is detected by filtering the selected three wavelength bands using the filtering unit. In another step, an intensity indicator for the three selected wavelength bands is determined using a processing unit. In another step, the object signature is classified using the processing unit based on the determined intensity indicator in order to identify the object. The steps of the method may be executed in the above-indicated order.

The method may enable a reliable object signature identification while processing only the important data required for the object signature identification. In particular, it is not the entire infrared wavelength spectrum that must be processed for object signature identification, but instead it is only the three selected wavelength bands, for example a combination thereof, based on which the object signature identification is carried out. This considerably reduces complex data processing operations since only few data from the acquired infrared wavelength spectrum is used while still providing a reliable object characterization.

In addition, an aspect of the inventive method also provides an improved human-machine interaction since the detected data, i.e., the detected three wavelength bands and the corresponding intensities, include sufficient information in order to generate an image, in particular a colored image, based on which an accurate object signature identification is possible. The method can thus improve the performance, for example of missile warning systems (MWS) and object tracking systems, by using spectral information. A colored image based on a color space infrared (IR) system, as will be explained in more detail below, may enable a multi-use of current missile approach warning (MAW) systems for additional use cases like electro-optical targeting, IR situational awareness view and a more robust MAW capability.

The identification of an object signature may include the identification of a signature of stationary and/or moving objects. For example, the object signature is a signature of a flying object like a rocket, a missile, an aircraft, etc. In this case, the signature may be indicative of an exhaust gas stream of these objects or a combustion process evolving from these objects. A further object signature that can be identified is the signature of exhaust gases or combustion processes originating at stationary ground facilities like a refinery, a power plant, etc. Therefore, it is possible that the identification of an object signature may include the identification of a signature of specific combustion products being generated by a combustion process provided by one or more of the above-mentioned objects. Multiple of these objects may be present in the environment and emit exhaust gases or combustion products for which a signature can be identified using the inventive method. In particular, the method described herein allows a distinction between such object signatures. If, in the following, reference is made to an "object", this may also refer to an "object signature".

In a step of the method infrared information from the environment is acquired using a detection unit. The detection unit may be an infrared sensor that is configured to capture infrared information, for example an infrared image, from the environment. The infrared sensor may be configured to obtain an entire infrared spectrum or at least a portion thereof. The obtained infrared spectrum is associated to the environment which means that the infrared sensor receives infrared information from one or more or all objects located in the environment of the infrared sensor. The result is an infrared wavelength spectrum associated with the environment that may include infrared information of several object in the environment.

In a further step, three wavelength bands of the infrared wavelength spectrum are selected. This may be carried out by presetting or adapting the filtering unit such that the filtering unit is able to detect the selected three wavelength bands. In an embodiment, as described below, the filtering unit may be adjusted such that it only collects and thus detects the three selected wavelength bands.

In a further step, a presence of the three wavelength bands within the obtained infrared wavelength spectrum in the environment is detected by filtering the selected three wavelength bands out of the acquired infrared information. It is possible that the obtained infrared spectrum of the environment is scanned for objects emitting all the three selected wavelength bands. In case all three wavelength bands are detected for a certain object within the environment, i.e., at a specified location within a received infrared image, only these three wavelength bands are used to determine the presence of the object. In other words, if said three wavelength bands are detected as being present in the environment, then an assumption can be made that an object of interest is located in the environment. In this manner, a presence of several objects of interest that all emit the selected three wavelength bands can be detected. In order to discriminate and distinguish between these several objects of interest, the method includes further steps as explained in the following.

In another step, an intensity indicator for the three selected wavelength bands is determined using a processing unit. The intensity indicator may be a single intensity representing the three detected wavelength bands or may represent a combination of intensities with which the three selected wavelength bands have been detected in the environment. Based on this additional information, i.e., the intensity indicator, a discrimination between the several objects of interest can be made.

In further step, the object signature can thus be classified based on the determined intensity indicator in order to identify the object signature. In other words, it is possible to classify one of the several detected objects of interest as an object of relevance, for example a missile, while classifying another one of the several detected objects of interest as an irrelevant object, for example a refinery or the sun, that may be disregarded for the actual purposes.

The above-described detection of a presence of a target of interest is made based on the presence of all three wavelength bands such that an assumption can be made that a target is present. The identification is obtained by a so called classification of the detected data and it, however, may be made according to specific intensities which are represented by the intensity indicator such that a statement can be made whether the detected target is a relevant target or not a relevant target.

Although the method is described as being applied with three wavelength bands, it should be understood that a presence of a further wavelength band of a wavelength spectrum in the environment can be detected and used for the object signature classification as described above. The further wavelength band may be selected from a wavelength spectrum other than the infrared wavelength spectrum, for example from an ultraviolet (UV) wavelength spectrum.

According to an embodiment, selecting the three wavelength bands of the infrared wavelength spectrum comprises selecting exactly three wavelength bands, i.e., not more and not less than three wavelength bands, of the sensed infrared wavelength spectrum.

Selecting exactly three wavelength bands is just sufficient to allow a classification of the object signature based on a three-dimensional space in which each dimension of the three-dimensional space defines an intensity amount for a respective one of the three detected wavelength bands for a specific object signature. This will be described in more detail below. In addition, the usage of only three wavelength bands reduces the processing resources required to process the detection step, determination step and the classification step of the inventive method.

According to an embodiment, determining the intensity indicator for the three detected wavelength bands comprises determining a first intensity amount corresponding to a first wavelength band of the three detected wavelength bands, determining a second intensity amount corresponding to a second wavelength band of the three detected wavelength bands and determining a third intensity amount corresponding to a third wavelength band of the three selected wavelength bands.

Based on these intensity amounts that can be allocated to each of the detected wavelength bands, the intensity indicator is determined, for example by applying an algorithm including a mathematical correlation. In other words, the classification may be made according to the specific intensities, wherein each of the intensities corresponds to an intensity measured for the corresponding wavelength band.

According to an embodiment, classifying the object signature based on the determined intensity indicator comprises determining an intensity function that depends on intensity amounts that correspond to the intensity indicator.

That is, a specific combination of or relationship between the intensities that represent the intensity indicator defines how a detected object, e.g., an object signature will be classified. The classification can be made according to predetermined classes such as "relevant", "not relevant", "dangerous", "not dangerous", etc. Furthermore, a classification can be made such that the detected object is assigned to a specified object class, for example natural hot sources (sun), industrial hot sources (refineries) or military hot sources (missiles).

According to an embodiment, classifying the object signature comprises defining a three-dimensional space, each dimension of the three-dimensional space defining an intensity amount for a respective one of the three detected wavelength bands.

The three-dimensional space may be a virtual three-dimensional space that is used for the classification. In particular, the three-dimensional space may be a three-dimensional infrared space into which the intensities corresponding to the detected three wavelength bands are projected. This may be done for one or more objects in the environment emitting the three wavelength bands.

According to an embodiment, classifying the object signature further comprises defining a three-dimensional sub-space within the three-dimensional space and determining whether a combination of the intensity amounts lies within the three-dimensional sub-space.

As described above, a combination of the intensity amounts may be represented by a corresponding intensity indicator. This three-component intensity indicator can be mapped or projected into the three-dimensional space as a single point or spot. If this point or spot lies within the three-dimensional sub-space, then the corresponding object will be classified differently than another object corresponding to a point or spot, i.e., projected intensity indicator, not lying within the three-dimensional sub-space. For example, an object corresponding to an intensity indicator that is projected into the three-dimensional sub-space, is classified as an object of interest, whereas an object corresponding to an intensity indicator that is projected outside of the three-dimensional sub-space, is classified as not being an object of interest. A further distinction during the classification can then be made between the intensity indicators lying within the sub-space in order to classify them as relevant object or non-relevant object. It is possible that only those intensity indicators that lie within the sub-space are considered for classification.

According to an embodiment, detecting the presence of the three wavelength bands of the infrared wavelength spectrum in the environment relates to a single object signature within the environment, wherein detecting the presence of the three wavelength bands of the infrared wavelength spectrum in the environment is carried out for multiple object signatures within the environment based on the acquired infrared information.

In other words, each object for which infrared information is acquired from the environment and for which the three selected wavelength bands can be detected are used for the subsequent classification process based on the intensities at the respective wavelength bands. In this manner, multiple object signatures can be identified at the same time. The classification then gives insight into the relevance of the detected object signatures, i.e., the object signatures can be assigned to a specific object that is currently present in the environment.

According to an embodiment, classifying the object signature comprises distinguishing between a man-made object signature in the environment and a natural object signature in the environment.

For example, a natural object signature may be a forest fire or a wildfire in the environment. A man-made object signature may include exhaust gas signatures or combustion process signatures evolving from moving or stationary man-made objects as described above.

According to an embodiment, classifying the object signature comprises distinguishing between a natural object signature in the environment, an industrial object signature in the environment and a military object signature in the environment.

A natural object signature may correspond to the sun or other hot sources in the environment. An industrial object signature may correspond to a refinery, a power plant or another industrial hot source in the environment. A military object signature may correspond to military hot source like an exhaust gas stream of a missile, rocket or aircraft. Such a military object signature may, however, also correspond to a stationary military facility.

According to an embodiment, each of the three selected wavelength bands comprises a span of multiple wavelength values within the infrared wavelength spectrum.

This means that each of the selected wavelength bands includes multiple specified infrared wavelength values. However, it is also possible that each of the three selected wavelength bands is represented by a single wavelength value of the infrared spectrum. The infrared wavelength bands are selected from the infrared spectrum, in particular from the so-called short-wave infrared spectrum (SWIR), the mid-wave infrared spectrum (MWIR) and/or the long-wave infrared spectrum (LWIR).

According to an embodiment, the method further comprises assigning a color information to the detected wavelength bands, in particular to the determined intensity amounts corresponding to the respective detected wavelength bands, using the processing unit in order to provide a colored image.

This means that each of the detected wavelength bands is associated to a specified color code or color enabling the generation of a picture or image representing the identified object signature. The wavelength bands may thus be used to colorize the infrared images provided to an operator in order to give spectral information. An aspect is thus to select a sensor or filtering unit that uses filters tuned at the three selected wavelength bands and installed on a wide band IR sensor. For example, sensors like an MCT (mercury cadmium telluride)-detector or an InSB (indium antimonide)-detector may be used and an additional filter may be applied to these types of sensors, similar to the concept used in CCD (charge-coupled device)-sensors to implement colors.

According to an embodiment, the method further comprises displaying the colored image on an interface unit, wherein the colored image includes the assigned color information.

The interface unit may be a human-machine-interface (HMI) like a physical display coupled to the processing unit. The HMI has the capability to mark specific spectral information, by using color components such as RGB (Red Green Blue) used in visible color images. The colors may be created based on the detected wavelength bands, so that an operator viewing a specific color on the display can understand the corresponding spectral component of the wavelength band. For example, if it is assumed to use RGB as a color base for the detected wavelength bands, with the first intensity amount for the first wavelength band assigned to red color, the second intensity amount for the second wavelength band assigned to green color and the third intensity amount for the third wavelength band assigned to blue color, this means that if the operator views something in red, he knows that this is in the first wavelength band and so on. In an example, a combination of the first and second wavelength bands and/or a combination of the corresponding first and second intensities may be assigned to a further color like yellow. By viewing a yellow color in the colored image, the operator is then able to understand that this target has the spectral contents of the combined first and second wavelength bands, with similar intensity. The same may apply to a combination of the first and third wavelength bands and/or a combination of the corresponding first and third intensities which can be assigned to a further color as well as to a combination of the second and third wavelength bands and/or a combination of the corresponding second and third intensities which can also be assigned to an even further color. Although not necessary, this advantageous human-machine-interaction is particularly helpful for an operator or pilot using the detection and classification results of the inventive method.

Summarizing the above explanations, an infrared space and its implementation in an infrared detector and in a classifier for advanced signature identification as well as its application in an advanced missile warning system like MWS or equivalents like a missile approach warner (MAW) can be provided. The inventive method enables infrared systems (e.g., a missile warning system, advanced trackers units and situation awareness vision systems) that can benefit from the three-dimensional color space model to implement advanced signature processing. A three-dimensional infrared space can be defined in order to have the capability to characterize a relevant IR signature (by using vector space components of a hyperspectral space) with specific wavelength bands available directly from the sensor and the others interpolated by a three-dimensional vector base. To implement this hyperspectral space, it is possible to provide advanced missile warning systems, such that they are able to work with three-band-vectors, using an IR sensor with a three-wavelength spectral response. The three wavelengths may be used as a vector base for the spectral IR domain. The first and second wavelength bands are, for example, selected in order to detect the sun and differentiate it from real missiles and the third wavelength band is selected in the range of the emission bands of typical oil gases as from refineries. Aircraft signatures and missile plumes can be expressed in this space domain and improve the detection and reconnaissance. In a similar way, ground, vegetation, benzene, $CO_2$ can be represented in the three-wavelength IR domain with the purpose of visual assistance, obstacle avoidance, environment monitoring, etc. The detection unit may use a filter pixel matrix with three wavelength bands in the IR domain. This matrix principle may be used to add a set micro filters on an IR sensor. To establish a human-machine-interface, the method may provide an IR spectral colorization resulting in that an operator can have a two-dimensional or a three-dimensional visual representation of the spectral contents of the surrounding environment, because the vector base is used to compose visible color images, wherein the use of the three wavelength bands for the colorization is similar to the three RGB components in a visible cameras.

According to an aspect, a system for identifying an object signature in an environment is provided. The system comprises a detection unit configured to acquire infrared information from the environment in order to obtain an infrared wavelength spectrum associated with the environment. The system further comprises a filtering unit configured to select three wavelength bands of the infrared wavelength spectrum and
 a processing unit configured to detect a presence of the three wavelength bands of the infrared wavelength spectrum in the environment by filtering the selected three wavelength bands using the filtering unit. The processing unit is configured to determine an intensity indicator for the three selected wavelength bands and is further configured to classify the object signature based on the determined intensity indicator in order to identify the object signature. The described system may be configured to execute the method steps of the method as described above.

According to an embodiment, the system is a stationary system like a ground missile warning system. Alternatively, the system is a mobile system like an aircraft's missile warning system.

According to an embodiment, the system is a missile warning system and the object signature is a signature of a missile identified by the missile warning system. The missile may be an air-to-air (AA) or surface-to-air (SA) missile.

The above-described method and the system improve aircraft protection from SA missile threats including MAN-PADS. Exemplary applications are the MWS application for which the spectral domain classification will permit to discriminate more sources and avoid false alarms, the tracker application for which the tracking function will be improved by using spectral features in order to not lose the track of an object, as well as the situation awareness application for which the vector-multispectral imagery provides colored IR images that can be implemented for an improved human-machine-interaction. Furthermore, the signature processing in the vector-based spectrum has the advantage that there is no need of a full and complete wavelength spectrum measurement which reduces complexity and costs and improves processing efficiency. The result is a low data stream with only three-component images instead of hypercube datagram streams.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
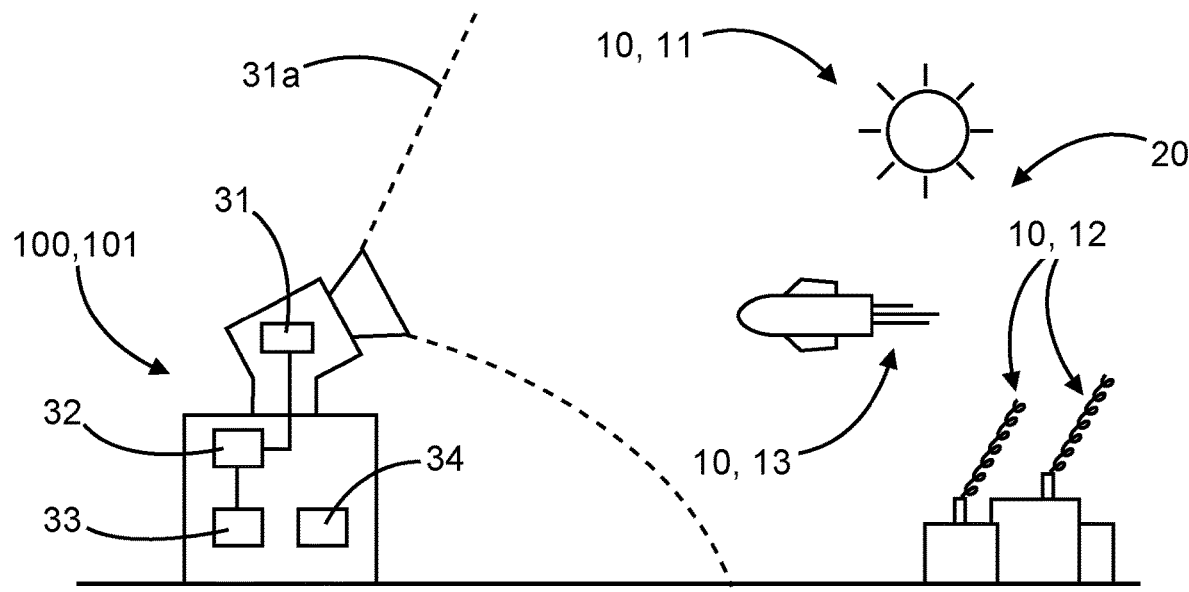
FIG. 1 shows a system for identifying an object signature in an environment according to an exemplary embodiment.

The representations and illustrations in the drawings are schematic and not to scale. A better understanding of the method and system described above may be obtained through a review of the illustrations accompanying this application together with a review of the detailed description that follows.

FIG. 1 shows a system 100, for example a stationary missile warning system 101, for identifying an object signature 10 in an environment 20. The system 100 comprises a detection unit 31 configured to acquire infrared information from the environment 20 in order to obtain an infrared wavelength spectrum associated with the environment 20. Infrared information from the environment 20 may be acquired from within a field of view 31a covered by the detection unit 31. The detection unit 31 may be an infrared sensor. The system further comprises a filtering unit 32 configured to select three wavelength bands $\lambda_1, \lambda_2, \lambda_3$ of the infrared wavelength spectrum and a processing unit 33 is configured to detect a presence of these selected three wavelength bands $\lambda_1, \lambda_2, \lambda_3$ (see FIG. 2A) of the infrared wavelength spectrum in the environment 20 by filtering the selected three wavelength bands $\lambda_1, \lambda_2, \lambda_3$ using the filtering unit 32. The processing unit 33 is configured to determine an intensity indicator I (see FIG. 2B) for the three selected wavelength bands $\lambda_1, \lambda_2, \lambda_3$. The processing unit is configured to classify the object signature 10 based on the determined intensity indicator I in order to identify the object signature. This classification can be made between a natural object signature 11, for example the sun, an industrial object signature 12, for example a refinery, and a military object signature 13, for example a missile. The result of the classification can be visualized with color information via the interface unit 34 which for example is a display. The system 100 shown in FIG. 1 can be a missile warning system or an object tracking system.

Although the system 100 of FIG. 1 is shown as being a stationary system 101, it is also possible that the system 100 is a mobile system. For example, the system 100 may be integrated in an aircraft, for example a military aircraft.

Figure 2A:
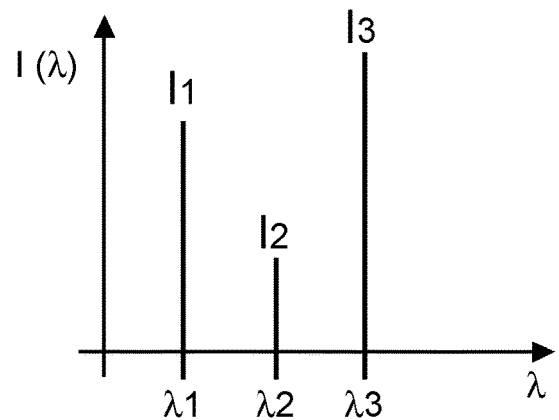
FIG. 2A shows a diagram with intensity amounts that correspond to three detected wavelength bands according to an exemplary embodiment.
Figure 2B:
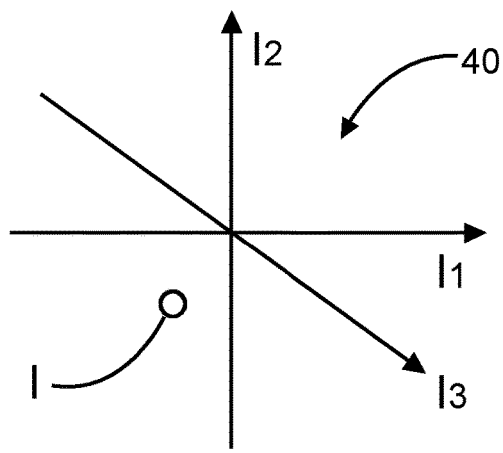
FIG. 2B shows a three-dimensional space and an intensity indicator that corresponds to three detected wavelength bands according to an exemplary embodiment.
Figure 2C:
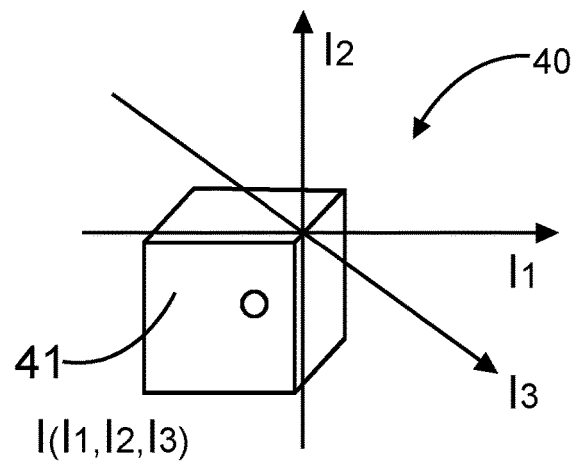
FIG. 2C shows the three-dimensional space and the intensity indicator of FIG. 2 lying within a three-dimensional sub-space according to an exemplary embodiment.

FIGS. 2A to 2C represent a spectrum space in which the intensity information is depicted as a function of the three detected wavelength bands $\lambda_1, \lambda_2, \lambda_3$. Since there are three intensity measurements, it is possible to define a volume in the spectrum space, for a more flexible classification of the target. In particular, FIG. 2A shows a diagram with intensity amounts $I_1, I_2, I_3$ that correspond to the three wavelength bands detected by the system 100 of FIG. 1. The three detected wavelength bands may be associated to one and the same object signature in the environment 20, for example the missile signature 13. As can be derived from FIG. 2A, the intensity amounts $I_1, I_2, I_3$ determined for the three detected wavelength bands are different. The three determined intensity amounts $I_1$, $I_2$, $I_3$ provide an intensity indicator I that represents the three intensity amounts $I_1$, $I_2$, $I_3$. In FIG. 2B, the intensity indicator I is projected (see spot I) to a three-dimensional space 40 in which the three dimensions respectively correspond to the three intensity amounts $I_1$, $I_2$, $I_3$. FIG. 2C now shows the three-dimensional space 40 of FIG. 2B with the projected intensity indicator I, that is $I(I_1, I_2, I_3)$. Therein, the intensity indicator I is located within a three-dimensional sub-space 41. This procedure can be repeated several times, i.e., for several object signatures in the environment. After that, an intensity indicator I that is located within the three-dimensional sub-space 41 may be considered as a target or object of interest that needs further consideration. For example, such targets or objects may be further distinguished based in their respective intensity indicators I.

Figure 3A:
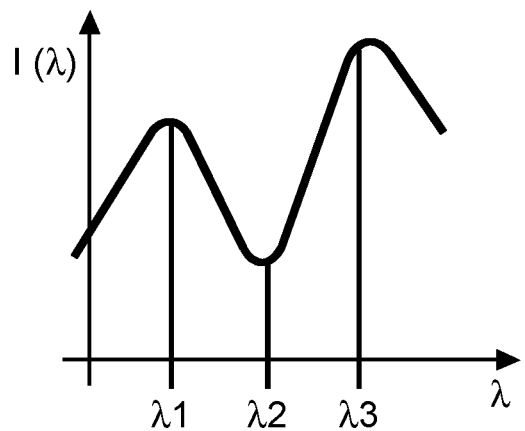
FIG. 3A shows a diagram with intensity amounts that correspond to three detected wavelength bands of a first object according to an exemplary embodiment.
Figure 3B:
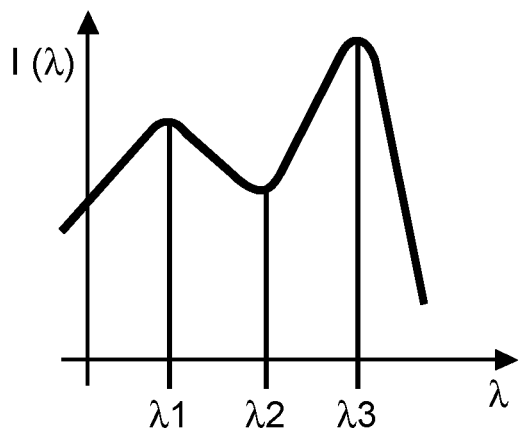
FIG. 3B shows a diagram with intensity amounts that correspond to three detected wavelength bands of a second object according to an exemplary embodiment.
Figure 3C:
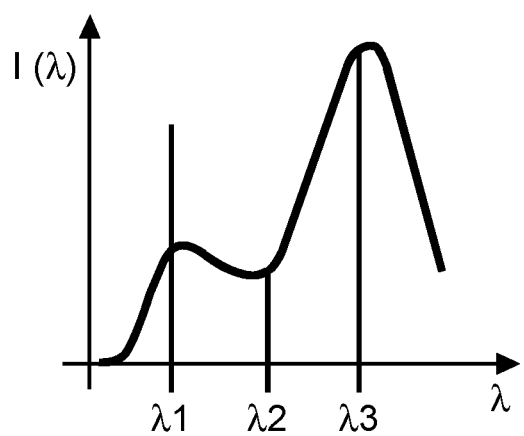
FIG. 3C shows a diagram with intensity amounts that correspond to three detected wavelength bands of a third object according to an exemplary embodiment.
Figure 3D:
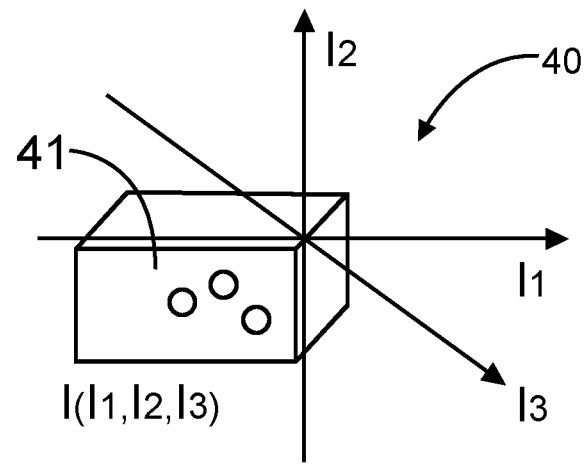
FIG. 3D shows a three-dimensional space with three different intensity indicators lying within a three-dimensional sub-space according to an exemplary embodiment.

The above principle shown in FIGS. 2A to 2C also applies to FIGS. 3A to 3D. FIG. 3A shows a diagram with intensity amounts that correspond to three detected wavelength bands $\lambda_1$, $\lambda_2$, $\lambda_3$ of a first object. FIG. 3B shows a diagram with intensity amounts that correspond to three detected wavelength bands $\lambda_1$, $\lambda_2$, $\lambda_3$ of a second object. FIG. 3C shows a diagram with intensity amounts that correspond to three detected wavelength bands $\lambda_1$, $\lambda_2$, $\lambda_3$ of a third object. It is noted that the three detected wavelength bands $\lambda_1$, $\lambda_2$, $\lambda_3$ may be the same wavelength bands $\lambda_1$, $\lambda_2$, $\lambda_3$ that are selected and detected for each of the three different object signatures. However, the combinations of the intensity amounts $I_1$, $I_2$, $I_3$ may be different, i.e., the ratios of the intensities $I_1$, $I_2$, $I_3$ for each object signature may be unique, which results in the different appearances of the interpolated intensity graphs shown in FIGS. 3A to 3C. Therefore, each object signature can be assigned to a distinct or different intensity indicator I, wherein the intensity indicator I for each object signature is projected into the three-dimensional space 40 (see the three spots in FIG. 3D). As can be derived from FIG. 3D, all three intensity indicators I are located within the three-dimensional sub-space 41 defining a region in which the object signatures are classified as being targets of interest as explained above. A further distinction between these three targets of interest may be made based on intensity indicator values corresponding the intensity indicators I.

In other words, the method described with respect to FIGS. 3A to 3D is useful when the target, i.e., the object signature, is not precisely identified by the three wavelength bands $\lambda_1$, $\lambda_2$, $\lambda_3$. An interpolation of the object signature on the three intensity lines can be made in order to classify also these targets. The object signatures of FIGS. 3A to 3C may then be considered as being from the same target type because they lie in the sub-space 41 defined for this detection and classification by the missile warning system. The detection is then made according to the presence of the respective intensity indicators I in the selected sub-space 41, also referred to as a volume or box. The result of this detection is that a target of interest, i.e., an object signature, is present. Furthermore, the classification is made according to the specific intensities I, wherein the result of this classification is that the detected target of interest is really a target (high relevance) or not a target (low relevance). The three wavelength bands that are used to find a λ-vector base consisting of $\lambda_1$, $\lambda_2$, $\lambda_3$ to map the spectrum and are selected in order to have good match on key sources or classes like natural hot sources (sun), industrial hot sources (refineries) and military hot sources (missiles). This means that the wavelength bands, i.e., the Lambdas are selected in order to discriminate these three classes. For example, the specific Lambdas are selected such that the Lambda ratios can be used as a "threshold" for the detection.

Figure 4:
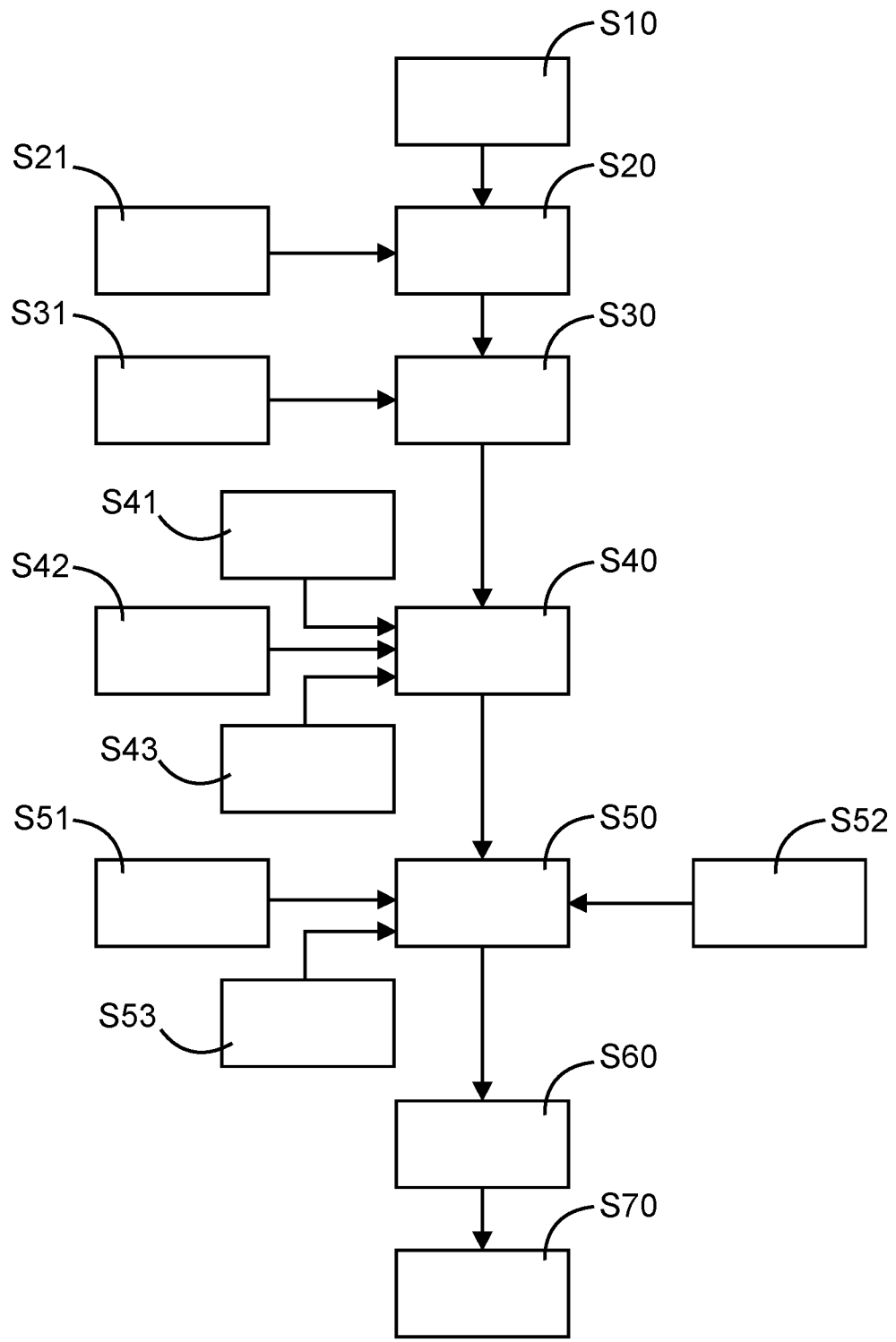
FIG. 4 shows a flow diagram of a method of identifying an object signature in an environment according to an exemplary embodiment.

FIG. 4 shows a flow diagram of a method of identifying an object signature 10 in an environment 20. The method may be executed by the system 100 shown in FIG. 1. The method comprises a step S10 of acquiring infrared information from the environment 20 using the detection unit 31 (see FIG. 1) in order to obtain an infrared wavelength spectrum associated with the environment 20. In another step S20 of the method, three wavelength bands $\lambda_1$, $\lambda_2$, $\lambda_3$ of the infrared wavelength spectrum are selected using the filtering unit 32 and, in another step S30, a presence of the three wavelength bands $\lambda_1$, $\lambda_2$, $\lambda_3$ of the infrared wavelength spectrum in the environment 20 is detected by filtering the selected three wavelength bands $\lambda_1$, $\lambda_2$, $\lambda_3$ using the filtering unit 32. In another step S40 of the method, an intensity indicator I is determined for the three selected wavelength bands $\lambda_1$, $\lambda_2$, $\lambda_3$ using the processing unit 33 and, in another step S50, the object signature 10 is classified using the processing unit 33 based on the determined intensity indicator I in order to identify the object signature.

The step S40 of determining the intensity indicator I for the three detected wavelength bands $\lambda_1$, $\lambda_2$, $\lambda_3$ comprises the step S41 of determining a first intensity amount $I_1$ corresponding to a first wavelength band $\lambda_1$ of the three detected wavelength bands $\lambda_1$, $\lambda_2$, $\lambda_3$, the step S42 of determining a second intensity amount $I_2$ corresponding to a second wavelength band $\lambda_2$ of the three detected wavelength bands $\lambda_1$, $\lambda_2$, $\lambda_3$ and the step S43 of determining a third intensity amount $I_3$ corresponding to a third wavelength band $\lambda_2$ of the three selected wavelength bands $\lambda_1$, $\lambda_2$, $\lambda_3$.

The step S50 of classifying the object signature based on the determined intensity indicator I comprises the step S51 of determining an intensity function that depends on intensity amounts $I_1$, $I_2$, $I_3$ that correspond to the intensity indicator I.

The step S50 of classifying the object signature 10 comprises the step S52 of defining a three-dimensional space 40, each dimension of the three-dimensional space 40 defining an intensity amount $I_1$, $I_2$, $I_3$ for a respective one of the three detected wavelength bands $\lambda_1$, $\lambda_2$, $\lambda_3$.

The step S50 of classifying the object signature further comprises the step S53 of defining a three-dimensional sub-space 41 within the three-dimensional space 40 and determining whether a combination of the intensity amounts $I_1$, $I_2$, $I_3$ lies within the three-dimensional sub-space 41 for detection.

The step S30 of detecting the presence of the three wavelength bands $\lambda_1$, $\lambda_2$, $\lambda_3$ of the infrared wavelength spectrum in the environment 20 comprises the step S31 of carrying out the detecting S30 for multiple object signatures within the environment 20 based on the acquired infrared information.

The method further comprises the step S60 of assigning a color information to the detected intensity amounts $I_1$, $I_2$, $I_3$ using the processing unit 33 in order to provide a colored image.

The method further comprises the step S70 of displaying the colored image on an interface unit 34, wherein the colored image includes the assigned color information.

In other words, the inventive method uses three infrared bands $\lambda_1$, $\lambda_2$, $\lambda_3$ as vector space dimensions, so that each object can be represented by a spectral interpolation on these three components. This will solve the problem of false alarms in a missile warning system and in a tracking system and it will increase also the probability of declaration of a threat. The improved HMI with spectral colorization will increase the situation awareness of the operator, allowing the immediate identification of a critical event, for example a nebulization of fuel in a flight refueling, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of identifying an object signature in an environment, comprising:
    acquiring infrared information from the environment using a detection unit to obtain an infrared wavelength spectrum associated with the environment;
    selecting three wavelength bands of the infrared wavelength spectrum using a filtering unit;
    detecting a presence of the three wavelength bands of the infrared wavelength spectrum in the environment by filtering the selected three wavelength bands using the filtering unit;
    determining an intensity indicator for the three selected wavelength bands using a processing unit; and
    classifying the object signature using the processing unit based on the determined intensity indicator to identify the object signature,
    wherein the classifying the object signature comprises defining a three-dimensional space, each dimension of the three-dimensional space defining an intensity amount for a respective one of the three detected wavelength bands.

2. The method according to claim 1, wherein selecting the three wavelength bands of the infrared wavelength spectrum comprises selecting exactly three wavelength bands ($\lambda_1$, $\lambda_2$, $\lambda_3$) of the infrared wavelength spectrum.

3. The method according to claim 1, wherein determining the intensity indicator for the three detected wavelength bands comprises determining a first intensity amount corresponding to a first wavelength band of the three detected wavelength bands, determining a second intensity amount corresponding to a second wavelength band of the three detected wavelength bands and determining a third intensity amount corresponding to a third wavelength band of the three selected wavelength bands.

4. The method according to claim 1, wherein classifying the object signature based on the determined intensity indicator comprises determining an intensity function that depends on intensity amounts that correspond to the intensity indicator.

5. The method according to claim 1, wherein classifying the object signature further comprises defining a three-dimensional sub-space within the three-dimensional space and determining whether a combination of the intensity amounts lies within the three-dimensional sub-space.

6. The method according to claim 1,
    wherein detecting the presence of the three wavelength bands of the infrared wavelength spectrum in the environment relates to a single object signature within the environment; and
    wherein detecting the presence of the three wavelength bands of the infrared wavelength spectrum in the environment is carried out for multiple object signatures within the environment based on the acquired infrared information.

7. The method according to claim 1, wherein classifying the object signature comprises distinguishing between a natural object signature in the environment, an industrial object signature in the environment and a military object signature in the environment.

8. The method according to claim 1, wherein each of the three selected wavelength bands comprises a span of multiple wavelength values within the infrared wavelength spectrum.

9. The method according to claim 3, further comprising:
    assigning a color information to the detected intensity amounts using the processing unit in order to provide a colored image.

10. The method according to claim 9, further comprising:
    displaying the colored image on an interface unit, wherein the colored image includes the assigned color information.

11. A system for identifying an object signature in an environment, comprising:
    a detection unit configured to acquire infrared information from the environment to obtain an infrared wavelength spectrum associated with the environment;
    a filtering unit configured to select three wavelength bands of the infrared wavelength spectrum; and
    a processing unit configured to detect a presence of the three wavelength bands of the infrared wavelength spectrum in the environment by filtering the selected three wavelength bands using the filtering unit;
    wherein the processing unit is configured to determine an intensity indicator for the three selected wavelength bands; and
    wherein the processing unit is configured to classify the object signature based on the determined intensity indicator to identify the object signature, and
    wherein for classifying the object signature, the processing unit is configured to define a three-dimensional space, each dimension of the three-dimensional space defining an intensity amount for a respective one of the three detected wavelength bands.

12. The system according to claim 11,
    wherein the system is a stationary system; or
    wherein the system is a mobile system.

13. The system according to claim 11, wherein the system is a missile warning system and wherein the object signature is a signature of a missile identified by the missile warning system.

14. The system according to claim 11, wherein the processing unit is configured to determine a first intensity amount corresponding to a first wavelength band of the three detected wavelength bands, to determine a second intensity amount corresponding to a second wavelength band of the three detected wavelength bands and to determine a third intensity amount corresponding to a third wavelength band of the three selected wavelength bands.

15. The system according to claim 14, wherein the processing unit is configured to assign a color information to the detected intensity amounts using the processing unit in order to provide a colored image.

16. The system according to claim 15, further comprising an interface unit for displaying the colored image, wherein the colored image includes the assigned color information.

17. The system according to claim 11, wherein the processing unit is configured to distinguish between a natural object signature in the environment, an industrial object signature in the environment and a military object signature in the environment.

* * * * *